United States Patent
La Vecchia

[19]

[11] Patent Number: 5,981,865
[45] Date of Patent: Nov. 9, 1999

[54] APPARATUS FOR UTILIZING SOLAR ENERGY

[76] Inventor: Nunzio La Vecchia, Monte Verità, Via Collina 93, CH-6612 Ascona, Switzerland

[21] Appl. No.: 09/092,304

[22] Filed: Jun. 5, 1998

[51] Int. Cl.$^6$ .................. H01L 31/052; H01L 31/048
[52] U.S. Cl. ................ 136/246; 136/250; 136/256; 136/257; 136/244; 136/251; 136/291; 126/648; 126/649; 126/684; 126/657
[58] Field of Search ....................... 136/246, 250, 136/256, 257, 244, 251, 291; 126/648, 649, 684, 657

[56] References Cited

U.S. PATENT DOCUMENTS

| | | | |
|---|---|---|---|
| 4,089,705 | 5/1978 | Rubin | 136/89 |
| 4,130,106 | 12/1978 | Clevett et al. | 126/270 |
| 4,202,004 | 5/1980 | Anderson | 357/30 |
| 4,238,247 | 12/1980 | Oster, Jr. | 136/246 |
| 4,446,854 | 5/1984 | Clevett et al. | 126/451 |
| 4,487,989 | 12/1984 | Wakefield et al. | 136/256 |
| 4,993,403 | 2/1991 | Downs et al. | 126/450 |

FOREIGN PATENT DOCUMENTS

| | | | |
|---|---|---|---|
| 3238797 A1 | 5/1984 | Germany | F24J 3/02 |

*Primary Examiner*—Alan Diamond
*Assistant Examiner*—Michael C. Miggins
*Attorney, Agent, or Firm*—Wenderoth, Lind & Ponack, L.L.P.

[57] ABSTRACT

An apparatus (10) for utilizing solar energy includes an outer shell body (11), an inner body (40) inside it, and a hollow body (30) provided in between which are formed in a shape of a uniform polyhedron, in particular a dodecahedron. The shell body (11) and the hollow body (30) are provided with at least one opening (12, 13, 15) for the entrance of solar rays. The shell body (11) is therein disposed above a reflector pan (20) and has a partial polyhedron form, in particular in dodecahedral form. The solar energy concentrated in the shell body (11) is converted and conducted further to a consumer. With this cost-effectively produced apparatus (10) an improved efficiency relative to know apparatus is attained.

32 Claims, 3 Drawing Sheets

APPARATUS FOR UTILIZING SOLAR ENERGY

BACKGROUND OF THE INVENTION

(1) Field of the Invention

The invention generally relates to an apparatus for utilizing solar energy. The invention more specifically relates to a solar energy apparatus which requires less space than a conventional solar energy apparatus.

(2) Description of the Prior Art

In a solar generating station according to publication DE-A-32 38 797, a number of heliostats are provided which reflect solar radiation, which enters into them, onto optical waveguides and radiation receivers. These radiation receivers are mounted on a support unit or a tower. This solar generating station requires a large-area for the heliostats and their associated optical waveguides. Therefore, this solar generating station only meaningfully can be used in regions in which sufficient space is available, such as for example in a desert or in mountain ranges.

SUMMARY OF THE INVENTION

Building on this known apparatus, the present invention was based on the object of creating an apparatus in which the solar energy can be converted at higher efficiency while utilizing less space and is suitable for small and large-scale facilities.

This object is achieved according to the invention through the use of an outer shell body having at least one opening for solar radiation, at least one inner body, and a reflector pan used to conduct the radiation towards the bodies.

With this apparatus according to invention the solar energy can be used in a surprising manner with improved efficiency and without production costs becoming higher than existing facilities. This apparatus can, moreover, due to its compactness be stationed at virtually any location, such as for example on a roof. Based on its size depending on the desired energy requirement, it can also be built small or very large.

BRIEF DESCRIPTION OF THE DRAWINGS

Embodiments of the invention as well as further advantages of the same are explained in further detail in conjunction with the drawings. The drawings depict.

DESCRIPTION OF THE PREFERRED EMBODIMENTS

Figure 1:
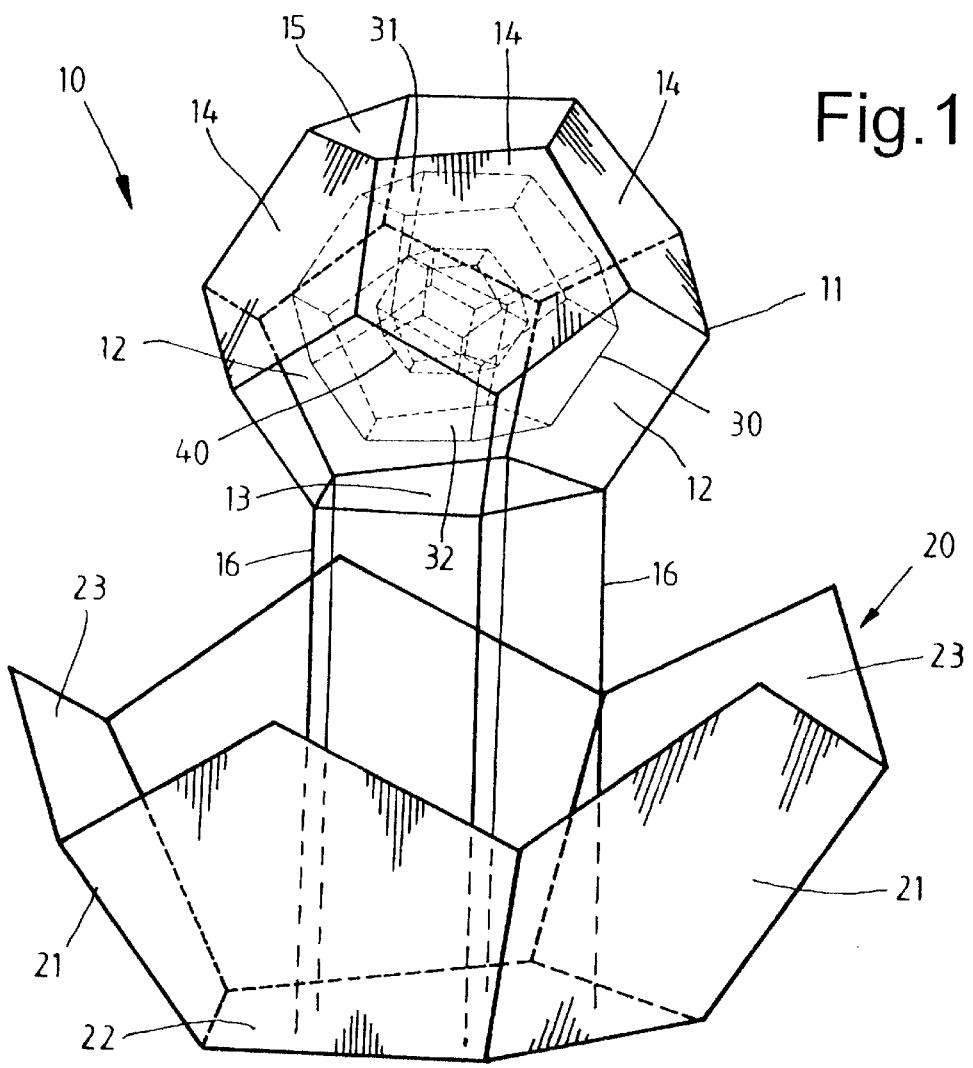
FIG. 1 a perspective side view of an apparatus according to the invention.

FIG. 1 shows a schematic representation of an apparatus 10 according to the present invention for utilizing solar energy. This apparatus 10 at its top comprises an outer shell body 11, a hollow body 30 inside the shell body 11, and an inner body 40 disposed in the hollow body 30. These bodies 11, 30, 40 are therein each individually formed of a uniform polyhedron, and are positioned in concentric arrangement with respect to one another. They can be fastened via several connecting rods (not illustrated) or the like. These connecting rods are preferably fixed at two adjacent corners.

According to the invention, associated with the shell body 11 is at least one reflector pan 20 for receiving solar radiation and reflecting it. This reflector pan 20 has the same shape as a lower portion of the shell body 11.

In a highly advantageous embodiment, the shell body 11, the hollow body 30, and the inner body 40 disposed within have a dodecahedral shape which is formed from twelve regular pentagons. The reflector pan 20, in turn, is also composed of a partial dodecahedron with regular pentagonal side walls 21 and a bottom face 22, respectively. The shell body 11 is, for example, set above the pan 20 via indicated support legs 16. A lower pentagonal face 13 of the shell body 11 and the bottom face 22 of pan 20 are disposed approximately horizontally and centrally with respect to one another. This shell body 11 can therein be aligned concentrically with respect to the partial dodecahedron of the pan 20 or also above its center. However, this shell body 11 can be aligned preferably on a central axis of the pan 20. The faces, formed by the pentagons, of bodies 11, 30, 40 and those of the reflector pan 20 are oriented parallel with respect to one another in order to obtain optimum reflection of the rays reflected by those bodies. Thus, the side faces 21 of the pan 20 are parallel to the pentagons 12 and these, in turn, are parallel to the corresponding faces of the hollow body 30, and the inner body 40.

The pentagons 12 and the lower horizontal pentagon 13, which forms the lower half of shell body 11, advantageously include openings so that the rays reflected by reflecting faces 23 of pan 20 can go through these openings of the pentagons 12 and 13 to arrive in the interior of the shell body 11. In the hollow body 30, upper and lower horizontal pentagons 31, 32 are formed as openings. The rays can accordingly enter at the top directly from the outside as direct sunlight and at the bottom from reflected rays into the interior of this hollow body 30. The hollow body 30 is advantageously coated with mirrors on the outside as well as also on the inside. The inner body 40 or the core is, in turn, fully closed and is implemented such that, depending on the application explained in the following, it either reflects the received rays by its mirror or absorbs them.

Figure 2:
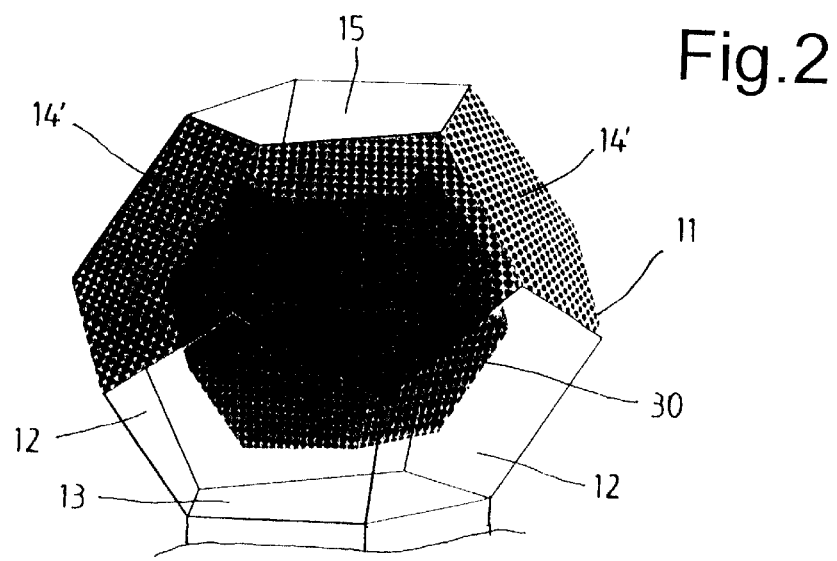
FIG. 2 a perspective view of the shell body of the apparatus according to FIG. 1.

According to FIG. 2, the shell body 11 and the hollow body 30 can be equipped on their outside and/or inside faces of the pentagons 14' with commercially available solar cells so that direct conversion of the solar energy into electric energy can take place. The shell body 11 is herein again illustrated, with the openings in the pentagons 12, 13, 15.

Figure 3:
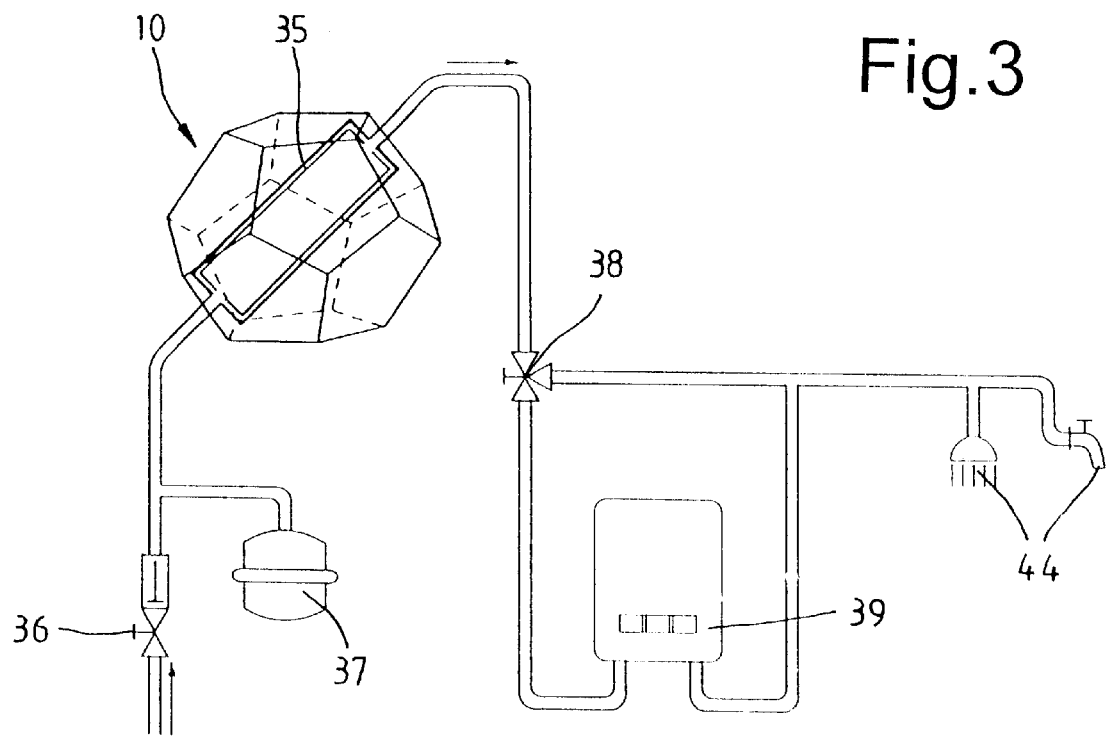
FIG. 3 a fundamental circuit diagram of a storage collector with an apparatus according to FIG. 1.

FIG. 3 shows a means according to the invention for the removal of the solar energy concentrated in the shell body 11. As schematically depicted, heat-conducting throughput pipes 35 are provided within the hollow body 30. A medium, preferably water, is transported by means of a pump through the opening of a valve 36 through the apparatus 10 mounted, for example on a house roof, and from the apparatus 10 to a consumer. The water after the throughput pipes 35, which is heated, can be sent from a switchover valve 38 in winter operation to a heater 39 and in summer for the warm water supply 44 in the households or the like. Furthermore, a collection container 37 is additionally indicated which is provided for pressure compensation.

The throughput pipes 35 can have a snake, screw, spiral or other shapes through the bodies 11, 30. In the present embodiment, the shell body 11 on its inner faces 14, the hollow body 30 inside and outside, and the inner body 40 on all of its twelve outer faces are advantageously equipped with mirror reflectors. The throughput pipes 35 are provided with a material converting the rays into thermal energy, for example a special iron alloy or a synthetic material, in order to attain maximum energy utilization.

Figure 4:
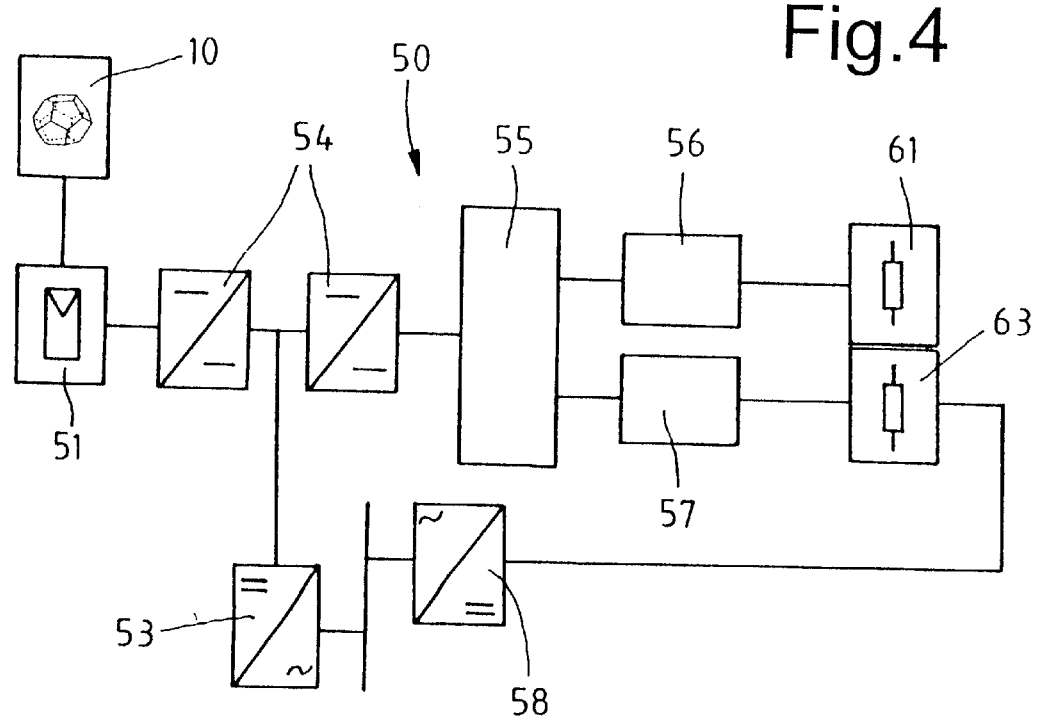
FIG. 4 a block diagram of a facility for the production of hydrogen with an apparatus according to FIG. 1.

FIG. 4 shows a further application for the energy generated by the apparatus 10, in which hydrogen can be generated in a conventional manner by means of facility 50. The means for the removal of the solar energy from the apparatus 10 can be similar to the means shown in FIG. 3 by means of throughput pipes not shown further. A gas turbine can be provided to drive a generator 51 which is driven with the gas heated in the throughput pipes. Such a facility 50 can also be implemented as a generating station, in which the apparatus 10 is constructed with a height up to ten meters or even taller.

In the facility 50 hydrogen and oxygen are generated by electrolysis or the like in a container 55. For this purpose a DC bus bar 54 connected to the generator 51 is provided. The container 55 is connected to storage units 56, 57 for the receiving of the separated hydrogen and oxygen respectively. In addition, the thermal energy generated with electrolysis and the residual electric energy can be utilized by means of indicated consumers 61, 63, and inverters 53, 58. This hydrogen generation can be used for example as a mixture for driving motor vehicles.

Figure 5:
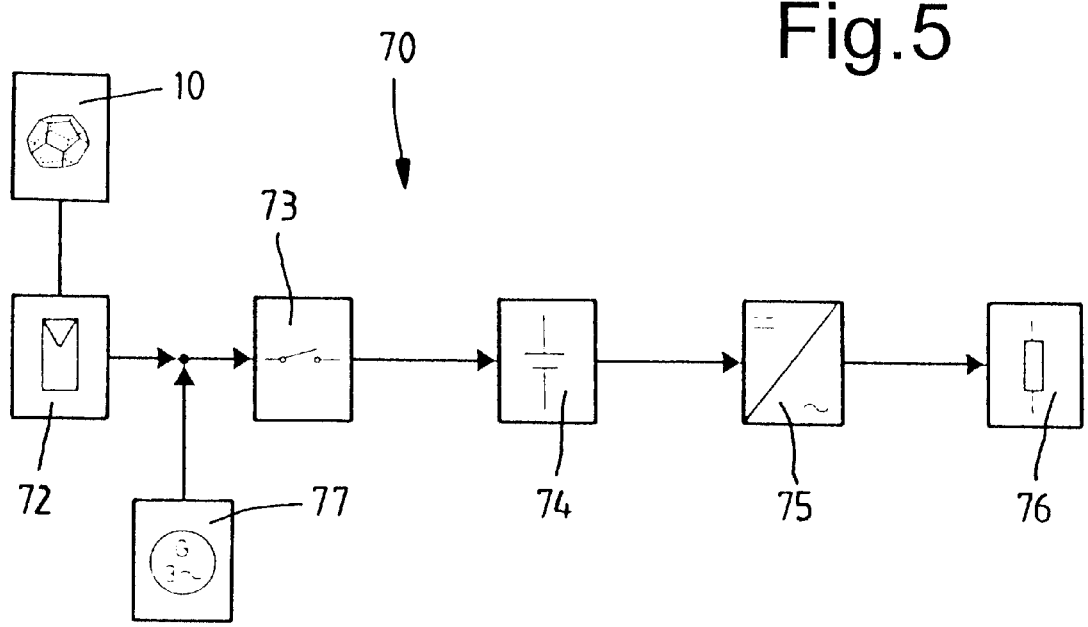
FIG. 5 a block diagram of a facility functioning according to the principle of photovoltaics for generating electricity with an apparatus according to FIG. 1.

FIG. 5 shows a further embodiment for the utilization of the solar energy gained in the apparatus 10. A facility 70 shown schematically is also provided as a photovoltaic facility in a known structure in which the mechanical energy generated by the apparatus 10 in the type according to FIG. 4, is supplied via a generator 72 or in the manner explained in FIG. 2, in which the electrical current generated directly from sunlight is supplied via a charge regulator 73 into a battery 74. A battery 74 and a consumer 76 can be connected directly or by interconnecting through an AC inverter 75.

The invention has been sufficiently demonstrated in the above explanation. Bodies having a dodecahedron form have been shown in practice to attain the highest efficiency. These bodies could in principle be formed with a polyhedron which is composed of hexagonal or polygonal faces.

The reflector pan 20 in the representation according to FIG. 1 is oriented with its bottom face 22 approximately horizontally. Depending on the location and latitude, it can also be disposed at an angle between 100 and 300 with respect to the horizontal. The shell body 11 would then be positioned, as in FIG. 1, on the perpendicular center axis of this pan 20.

Furthermore, in the shell body more than one hollow body 30 could also be provided, i.e., another one disposed between it and the inner body 40 could be fastened at an appropriate spacing.

I claim:

1. An apparatus for utilizing solar energy from solar rays for use by a consumer, comprising:
   an outer shell body having a uniform polyhedron shape, said outer shell body having outer shell body faces, and at least one of said outer shell body faces includes an opening for the solar rays;
   an inner body having said uniform polyhedron shape, said inner body having inner body faces, and said inner body disposed within said outer shell body;
   a reflector pan having a shape formed from a portion of said uniform polyhedron shape, said reflector pan having reflector pan faces, and said reflector pan being disposed below said outer shell body; and
   a means for converting solar energy concentrated in said outer shell body for use by the consumer.

2. The apparatus according to claim 1, further comprising a hollow body having said uniform polyhedron shape, said hollow body having hollow body faces, and said hollow body concentrically disposed between said outer shell body and said inner body.

3. The apparatus according to claim 2, wherein said uniform polyhedron shape is a dodecahedron having regular pentagonal faces.

4. The apparatus according to claim 3, wherein said outer shell body faces, said hollow body faces, said inner body faces, and said reflector pan faces are oriented in an approximately parallel arrangement with respect to each other.

5. The apparatus according to claim 2, wherein said hollow body faces include an outside mirrored face.

6. The apparatus according to claim 2, wherein said hollow body faces include an inside mirrored face.

7. The apparatus according to claim 1, wherein said uniform polyhedron shape is a dodecahedron having regular pentagonal faces.

8. The apparatus according to claim 1, wherein said outer shell body faces, said inner body faces, and said reflector pan faces are oriented in an approximately parallel arrangement with respect to each other.

9. The apparatus according to claim 1, wherein said outer shell body faces include an inside mirrored face.

10. The apparatus according to claim 1, wherein said inner body faces include an outside mirrored face.

11. The apparatus according to claim 1, wherein said inner body faces include an inner body solar cell face with an outside and provided with a solar cell on said outside of said inner body solar cell face.

12. The apparatus according to claim 11, wherein said outer shell body faces include an outer shell body solar cell face with an outside and provided with a second solar cell on said outside of said outer shell body solar cell face.

13. The apparatus according to claim 12, wherein said outer shell body faces include an inside mirrored face.

14. The apparatus according to claim 1, wherein said outer shell body faces include a lower pentagonal face.

15. The apparatus according to claim 14, wherein said reflector pan faces include a bottom face disposed parallel and centrally lower with respect to said lower pentagonal face, and five side walls attached to said bottom face.

16. The apparatus according to claim 1, wherein said means for converting solar energy includes heat-conducting throughput pipes disposed in said outer shell body.

17. The apparatus according to claim 16, wherein said means for converting solar energy includes a medium conducted through said heat-conducting throughput pipes.

18. The apparatus according to claim 17, wherein said medium is Water.

19. The apparatus according to claim 17, wherein said medium is a gas.

20. The apparatus according to claim 16, wherein said means for converting solar energy includes a collection container for pressure compensation within said heat-conducting throughput pipes.

21. The apparatus according to claim 1, further comprising a support leg disposed between said outer shell body and said reflector pan.

22. An apparatus for utilizing solar energy from solar rays, comprising:
   an outer shell body having a uniform polyhedron shape, said outer shell body having outer shell body faces, and at least one of said outer shell body faces includes an opening for the solar rays;

an inner body having said uniform polyhedron shape, said inner body having inner body faces, and said inner body disposed within said outer shell body; and a reflector pan having a shape formed from a portion of said uniform polyhedron shape, said reflector pan having reflector pan faces, and said reflector pan being disposed below said outer shell body.

23. The apparatus according to claim 22, further comprising a hollow body having said uniform polyhedron shape, said hollow body having hollow body faces, and said hollow body concentrically disposed between said outer shell body and said inner body.

24. The apparatus according to claim 22, wherein said uniform polyhedron shape is a dodecahedron having regular pentagonal faces.

25. The apparatus according to claim 22, wherein said outer shell body faces, said inner body faces, and said reflector pan faces are oriented in an approximately parallel arrangement with respect to each other.

26. The apparatus according to claim 22, wherein said outer shell body faces include an inside mirrored face.

27. The apparatus according to claim 22, wherein said inner body faces include an outside mirrored face.

28. The apparatus according to claim 22, wherein said inner body faces include an inner body solar cell face with an outside and provided with a solar cell on said outside of said inner body solar cell face.

29. The apparatus according to claim 28, wherein said outer shell body faces include an outer shell body solar cell face with an outside and provided with a second solar cell on said outside of said outer shell body solar cell face.

30. The apparatus according to claim 29, wherein said outer shell body faces include an inside mirrored face.

31. The apparatus according to claim 22, wherein said outer shell body faces include a lower pentagonal face.

32. The apparatus according to claim 31, wherein said reflector pan faces include a bottom face disposed parallel and centrally lower with respect to said lower pentagonal face, and five side walls attached to said bottom face.

\* \* \* \* \*